(12) United States Patent
Chmielewski et al.

(10) Patent No.: US 6,330,607 B1
(45) Date of Patent: *Dec. 11, 2001

(54) METHOD AND SYSTEM FOR RECOVERING SYSTEM RESOURCES USED BY AN INACTIVE TELNET CLIENT

(75) Inventors: Paul Richard Chmielewski, Rochester, MN (US); Thomas Edwin Murphy, Jr., Binghamton, NY (US); Paul Francis Rieth, Apalachin, NY (US); Jeffrey Scott Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,216

(22) Filed: May 4, 1999

Related U.S. Application Data

(62) Division of application No. 09/050,678, filed on Mar. 30, 1998, now Pat. No. 5,946,465.

(51) Int. Cl.⁷ .................................................. G06F 15/16
(52) U.S. Cl. ............................................................ 709/227
(58) Field of Search ................................... 709/200, 223, 709/226, 227, 237, 248

(56) References Cited

U.S. PATENT DOCUMENTS 5,142,622   8/1992   Owens ................................ 395/200
5,193,151   3/1993   Jain ..................................... 395/200
5,442,637   8/1995   Nguyen ................................. 371/5.5
5,619,645   4/1997   Montenegro et al. ........... 395/185.01
5,623,601   4/1997   Vu .................................... 395/187.01
5,673,322   9/1997   Pepe et al. ............................. 380/49
5,710,883   1/1998   Hong et al. ...................... 395/200.17

FOREIGN PATENT DOCUMENTS 08-161248   6/1996   (JP) .............................. H04L/29/14
09-46396    2/1997   (JP) .............................. H04L/29/14

OTHER PUBLICATIONS

Network Working Group, *Telnet Timing Mark Option*, Request for Comments, RFC 860, May 1983, 4 pages.

IBM Technical Disclosure Bulletin, 04/94, p. 601–608.

*Primary Examiner*—Robert B Harrell
(74) *Attorney, Agent, or Firm*—Shelly M Beckstrand

(57) ABSTRACT

A computer executing a Telnet application manages usage of a system resource by issuing through a transport layer directed to a specific client a DO TIMING MARK command. Responsive to receiving a WILL TIMING MARK or WONT TIMING MARK response from the specific client, the Telnet application calculates a WAIT time; and responsive to receiving no WILL TIMING MARK or WONT TIMING MARK response from the specific client within said WAIT time, the Telnet application causes release of system resource used by the client.

10 Claims, 4 Drawing Sheets

METHOD AND SYSTEM FOR RECOVERING SYSTEM RESOURCES USED BY AN INACTIVE TELNET CLIENT

CROSS-REFERENCES TO RELATED APPLICATIONS

This application is a divisional of U.S. patent application Ser. No. 09/050,678, filed Mar. 30, 1998 for "Method and System for Recovering System Resources Used by an Inactive Telnet Client", now U.S. Pat. No. 5,946,465.

U.S. patent applications Ser. No. 09/050,677 now U.S. Pat. No. 6,154,768, filed Mar. 30, 1998, entitled "System and Method for Negotiating Functions and Features", and U.S. patent application Ser. No. 09/050,679 filed Mar. 30, 1998, entitled "System and Method for Building and Exchanging Encrypted Passwords Between a Client and Server", now U.S. Pat. No. 6,182,220, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to the management of system resources in a Telnet environment, and more particularly to the use of a round trip time (RTT) value for recovering server system resources used by a Telnet client which has become inactive.

2. Background Art

TCP/IP Telnet servers use a timing mark (*Telnet Timing Mark Option*, RFC 860, May 1983) to determine if Telnet clients have received and processed any transmitted data, or even if they are still connected to the server. The Telnet server periodically (i.e., every 10 minutes) sends a query called a timing mark to the client, and interprets any failure to reply to the timing mark as an indication the client is no longer active or connected to the server. This is a highly desirable function in Telnet servers, as it allows servers to reclaim system resources from clients that are no longer active or connected. The RFC 860 timing mark is used as an indicator that the client has processed a data stream up to this point. As part of this process, the client must send a reply to let the server know that it did indeed get the timing mark query and thus the server knows that all data up to the timing mark got processed.

Since Telnet servers are not typically configured with a transport layer round trip time (RTT) value to determine the maximum time to wait for a reply to a timing mark query, they tend to wait a very long time for replies. The actual wait tends to be a function of the transport protocol (TCP) layer, which is not visible or configurable by the Telnet server. This is unsatisfactory, as most transport protocols use RTT values that are very large time periods in TCP/IP, often values larger than system administrators would like to configure.

TCP/IP can run across a Wide Area Network (WAN), and the response time across a WAN can be considerably larger than across a Local Area Network (LAN). The combination of WAN and LAN clients on any Telnet server can have RTT periods which vary by many seconds or even minutes. This makes it difficult to pick a suitable RTT value that will work for all clients unless a very large value is selected. The larger a value selected, the longer to recover unused system resources.

It is an object of the invention to detect a lost session.

It is a further object of the invention to provide at the application level recovery of system resources used by a Telnet client as quickly as possible after the client has become inactive.

It is a further object of the invention to provide an application level inactivity timer for a Telnet client that will work across any kind of network, allowing quick reclamation of any system resources which may be locked up by a no longer connected or active client.

SUMMARY OF THE INVENTION

In accordance with the invention, a computer executing a Telnet application manages usage of a system resource by issuing through a transport layer directed to a specific client a DO TIMING MARK command. Responsive to receiving a WILL TIMING MARK or WONT TIMING MARK response from the specific client, the Telnet application calculates a WAIT time; and responsive to receiving no WILL TIMING MARK or WONT TIMING MARK response from the specific client within said WAIT time, the Telnet application causes release of system resource used by the client.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
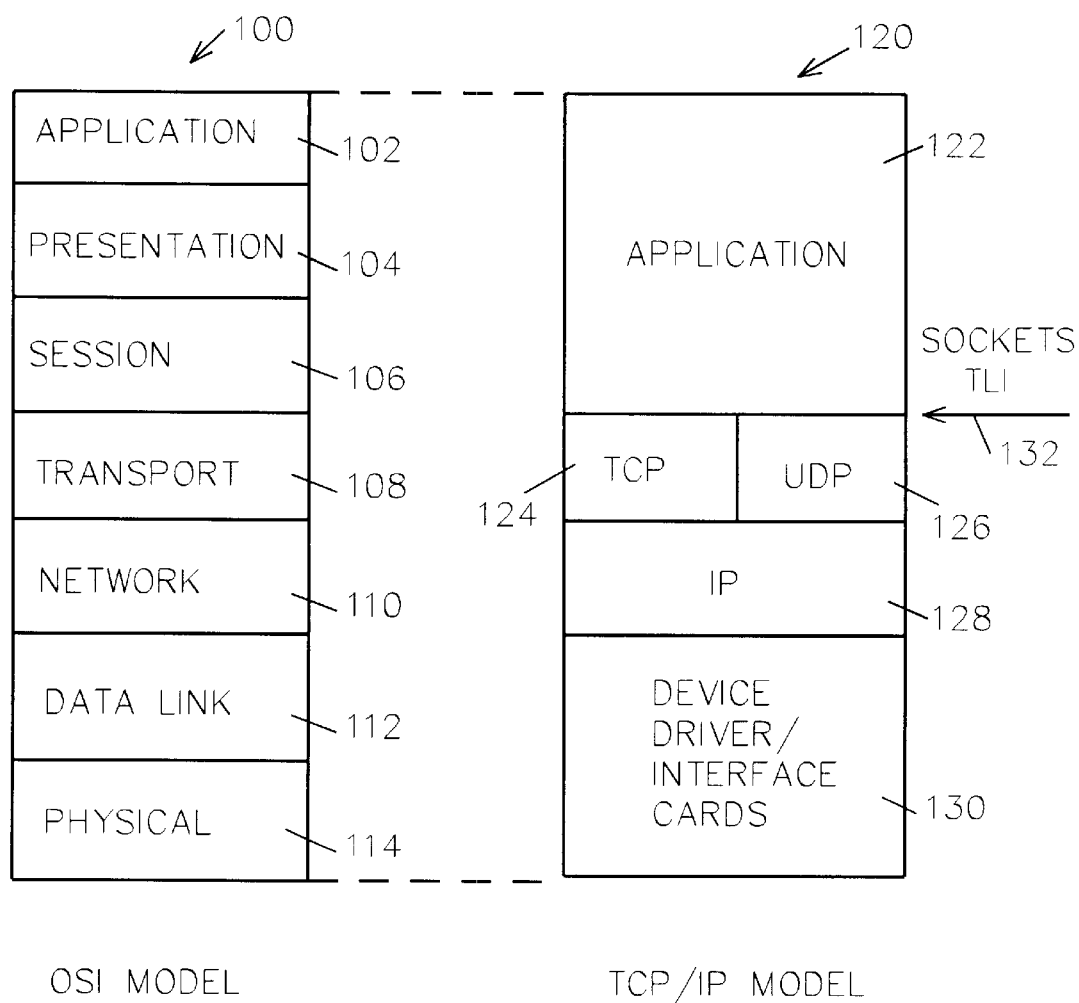
FIG. 1 is a system diagram illustrating the manner in which the seven layers of the Open System Interconnection (OSI) model maps to the four layers of a TCP/IP (Telnet) protocol.

Referring to FIG. 1, the manner in which the seven layers of the Open System Interconnection (OSI) model 100 maps to the four layers of a TCP/IP (Telnet) protocol 120 is set forth. TCP/IP application level 122 corresponds to the application 102, presentation 104, and session 106 layers of the OSI model. TCP 124 and UDP 126 levels correspond to the transport level 108. IP level 128 corresponds to network level 110. Device driver and interface card 130 corresponds to the data link 112 and physical 114 levels. The sockets transport library interface (TLI) is at 132.

In accordance with the OSI model, seven layers of functionality are the physical layer 114, the data link layer 112, and the network layer 110, the transport layer 108, the session layer 106, the presentation layer 104, and the application layer 102. (See McDaniel, George. IBM Dictionary of Computing, McGraw Hill, 1994, page 478.) Each layer conceptually provides function that is used by the next higher layer. The physical layer 114 is the hardware: the specifics of how (electrically, and such) data is transmitted over a certain network medium. The data link layer 112 is concerned with using the physical layer to move data from one machine to another on a single network. The network layer 110 uses the data link layer to move data from one machine to another over different networks.

Figure 2:
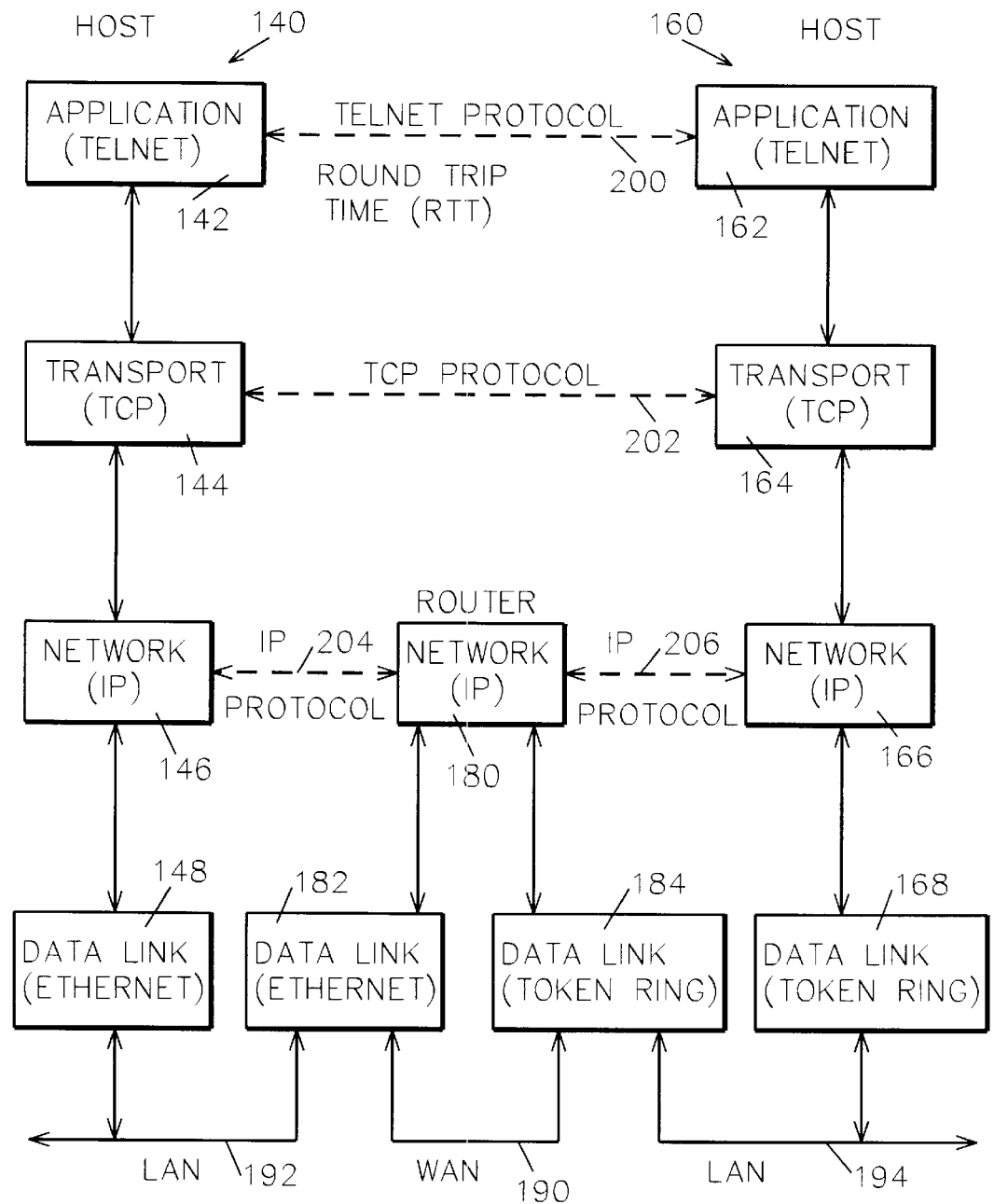
FIG. 2 is a system diagram illustrating how Telnet data flows through the four layers of a Telnet protocol stack and across local area networks (LANs) and wide area networks (WANs.)

FIG. 2 is a system diagram illustrating how Telnet data flows through the four layers 142, 144, 146, 148 and 162, 164, 166 and 168 of a Telnet protocol stack at hosts 140, 160 and across local area networks (LANs) 192, 194 and wide area networks (WANs) 190. LAN 194 implements token ring, and LAN 192 implements Ethernet technologies. Router 180 is a host implementing IP protocols interfacing Ethernet data link 182 and token ring data link 184 protocols on WAN 190.

RTT 200 is a measure of the time required for a request and response back to occur at the Telnet application level, along the path 142 to 144 to 146 to 148 to 182 to 180 to 184 to 168 to 166 to 164 to 162 and back between a server 140 and a specific client 160. Line 202 represents the time it takes for a query and a reply between transport layers 144 and 164. Lines 204 and 206 represent the time it takes for a query and a reply between network layers 146 and 180, and 180 and 166, respectively. These lines 200, 202, 204, 206 represent different round trip times, the values of which are different and may have different uses. Of relevance to the present invention is the round trip time (RTT) 200 between the Telnet application layers 142 and 162.

Figure 3:
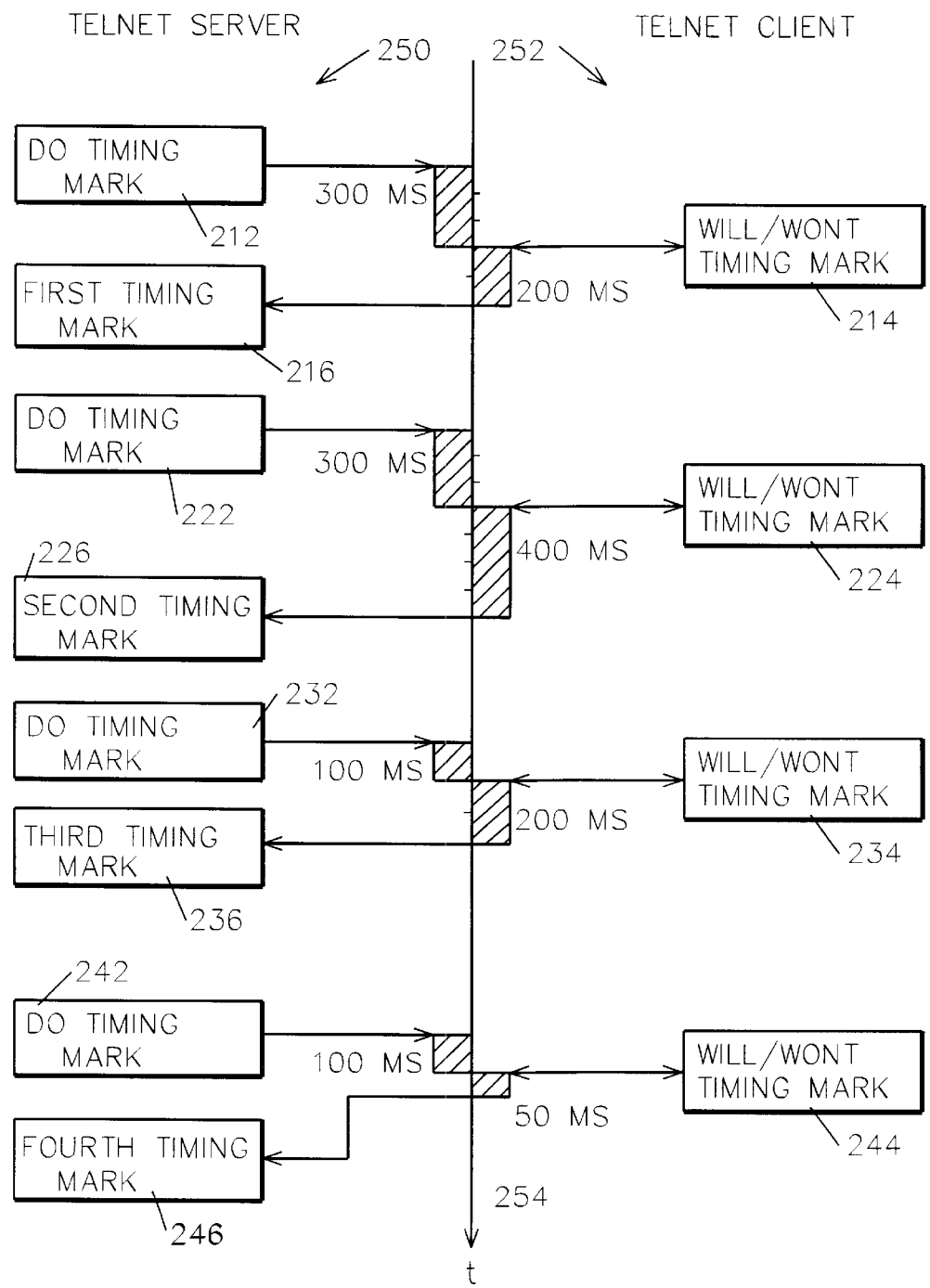
FIG. 3 is a timing diagram illustrating the use of a client's WILL or WONT reply to a DO TIMING MARK command issued by the server to calculate the client's RTT.

FIG. 3 is a timing diagram illustrating the use of a client's WILL or WONT reply to a DO TIMING MARK command issued by the server to calculate the client's RTT.

In accordance with the invention, the Telnet application layer calculates for each client a round trip time (RTT) value which it then uses to manage the use of system resources. The RTT value is calculated using an adaptive sampling algorithm to weigh the RTT for a timing mark exchange, such as:

$$RTT=(y*AVG\_RTT)+((1-y)*NEW\_RTT\_SAMPLE) \quad (1)$$

where y is a value between 0 and 1.

Using formula (1), picking a value for y very close to 1 effectively ignores the last RTT value (NEW_RTT_SAMPLE), making the weighted average RTT value (AVG_RTT) more significant. Letting y be almost 0 makes the weighted average change more quickly, making the last RTT value more significant. The value selected for y may be a configuration option for the Telnet server. If y is selected or configured at about y=0.9, then rapid changes in the RTT value may be prevented.

In accordance with a preferred embodiment, the wait time for a timing mark reply before declaring a client as lost is set equal to double (n=2) the RTT value.

$$WAIT=n*RTT \quad (2)$$

$$WAIT=n*((y*AVG\_RTT)+((1-y)*NEW\_RTT\_SAMPLE)) \quad (3)$$

Referring to FIG. 3, Telnet server 250 issues in step 212 a DO TIMING MARK to Telnet client 252 across IP transport layer 254 (which involves the path 144 to 146 to 148 to 182 to 180 to 184 to 168 to 166 to 164 and back.) In this specific example, 300 ms after server 250 issues the DO TIMING MARK command, it is received by Telnet client 252 which, in step 214, issues either a WILL TIMING MARK or WONT TIMING MARK response back to the transport layer 164; and this response is received 200 ms later by server 250 which in step 216 calculates a first timing mark RTT1, as follows:

$$RTT=(Y*AVG\_RTT)+((1-y)*NEW\_RTT\_SAMPLE) \quad (4)$$

where y=0.9

$$RTT1=(0.9*(300+200))+(0.1*(300+200))=500 \text{ ms} \quad (5)$$

Thereafter, in step 222 Telnet server issues a DO TIMING MARK which is received by client 252 300 ms later, which responds in step 224 with either a WILL TIMING MARK or WONT TIMING MARK. The response is received by server 250 400 ms later, which then in step 226 calculates the second timing mark RTT2, as follows:

$$RTT2=(0.9*500)+((1-0.9)*(300+400))=520 \text{ ms} \quad (6)$$

Similarly in steps 232 and 242 server 250 issues subsequent DO TIMING MARK commands which after 100 ms are received by client 252. In steps 234 and 244 client 252 responds with a WILL TIMING MARK or WONT TIMING MARK, and these are received by server 250 after 200 and 50 ms, respectively. In steps 236 and 246 server 250 calculates the third and fourth timing marks, as follows:

$$RTT3=(0.9*(500+520/2))+((1-0.9)*(100+200))=489 \text{ ms} \quad (7)$$

$$RTT4=(0.9*((500+520+489)/3))+((1-0.9)*(100+50))=467.7 \text{ ms} \quad (8)$$

While equation (4) has been used in this example to calculate the RTTs, variations on this adaptive algorithm may use mean and variance to smooth or estimate the RTT value. In either case, an inactivity timer is dynamically set for a Telnet client that will work across any kind of network, allowing quick reclamation of any system resources which may be locked up by a no longer connected or active client. It is immaterial whether the client responds to a DO TIMING MARK with a WILL TIMING MARK or a WONT TIMING MARK. In either event, the elapsed time is useful for calculating the RTT.

Figure 4:
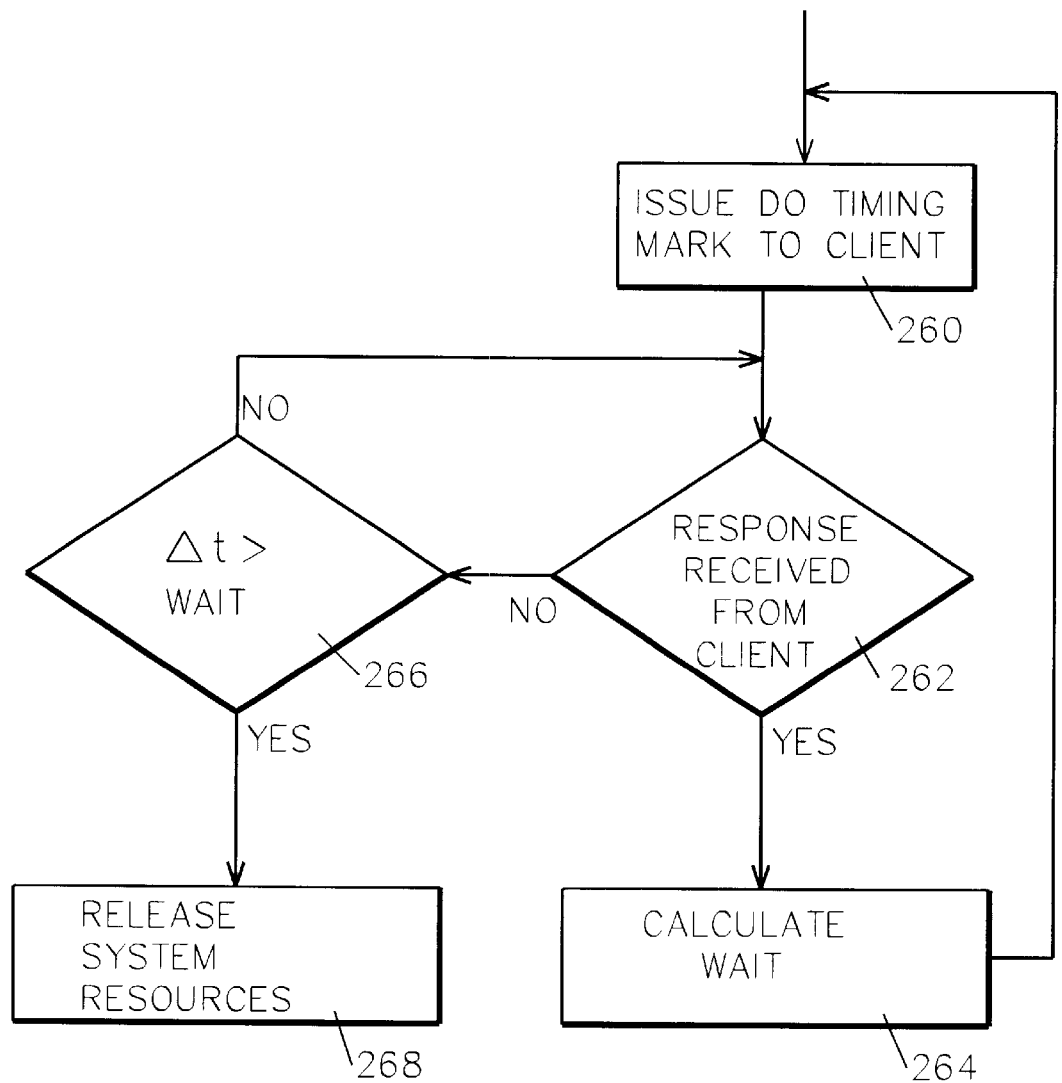
FIG. 4 is a flow diagram illustrating the method steps of the invention.

Referring to FIG. 4, in operation, Telnet server 250 in step 260 issues a DO TIMING MARK to client 252 and begins waiting (Δt) in steps 262 and 266 for the WILL TIMING MARK or WONT TIMING MARK response from client 252. If the response is received before Δt exceeds WAIT, in step 264 server 250 calculates a new WAIT period using, for example, equation (2) and issues in step 260 a next DO TIMING MARK to client 252. If, in step 266, it is determined that the wait time (Δt) exceeds the previously calculated WAIT time, then in step 268 Telnet server 250 releases system resources being used by this client 252.

In accordance with a more specific embodiment of the invention, many handheld wireless devices, such as may be used by nurses in a chain of hospitals, are used to read and update patient information stored on a central AS/400 system using one of any number of 25,000 applications developed for the IBM AS/400 system. Access to the application on system 140 is over WAN 190, and each nurse running an application represents a job running on system 140. Thus, there exists a large plurality (perhaps thousands) of jobs on host system 140, and this constitutes significant workload and resource contention on the system. Managing this workload is a priority and cost management problem. Jobs that are idle consume memory and resource pools that could be better used managing active applications and result in additional cost. WAN 190 introduces a different response time for each nurse device, which can vary significantly depending on traffic and networks being crossed. Imposing a "Telnet client is idle after xx minutes to force the Telnet session to end" on each Telnet session is not a good solution, since WAN 190 affects the response time and could result in an inactivity time larger than the idle time for ending the session. Telnet has no way to know if the client is still active unless it sends a query and gets a response or until the client sends a request of its own. Unless the client replies to a query, the Telnet server 140 cannot properly end the connection and recover the job. Also, a client nurse may have powered off her handheld device, had the battery die, or so forth, and thus gone idle without having had the opportunity to send an "end connection" command.

In accordance with the invention, idle jobs are recovered without imposing draconian restrictions across all jobs just to recover some jobs, by enabling Telnet to send a client query and calculate a custom timeout value by which a reply to the query can be expected. If no reply is received within this time period, server 140 may conclude that the client 160 is no longer running, or is lost. This running timeout value is calculated using the elapsed time from previous connections, and thus reflects conditions on WAN 190. By waiting this custom amount of time, Telnet server 140 knows with a good deal of confidence if the client Telnet session is still running.

In further accordance with the invention, a nurse will not lose her connection to her virtual device and be locked out for what could be an unreasonable amount of time. That is, inasmuch as each nurse may select a specific virtual display device name (i.e., nurse name or identification number) on server 140, even though that virtual device is a system resource being managed by host 140, it will not be reused until after termination of the nurse's job.

ADVANTAGES OVER THE PRIOT ART

It is an advantage of the invention that an inactivity timer is provided for a Telnet client that will work across any kind of network, allowing quick reclamation of any system resources which may be locked up by a no longer connected or active client.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for managing usage of a system resource at a server by each of a plurality of clients in a communications system, comprising the steps of:
   tailoring a wait period for each specific client of said plurality of clients, including
      issuing through a transport layer a DO TIMING MARK command to each specific client;
      responsive to receiving a WILL TIMING MARK or WONT TIMING MARK response from said specific client, calculating said period for said specific client; and
   responsive to receiving no WILL TIMING MARK or WONT TIMING MARK response from said specific client within said WAIT time, releasing said system resource.

2. The method of claim 1, said wait period being calculated at an application layer as wait period=$n*((y*AVG\_RTT)+((1-y)*NEW\_RTT\_SAMPLE)$;

where AVG_RTT is the average wait time, NEW_RTT_SAMPLE is the most recently measured wait time between issuing said DO TIMING MARK and receiving said WILL TIMING MARK or WONT TIMING MARK response, y is a parameter set between 0 and 1 for selectively weighting the significance of said NEW_RTT_SAMPLE, and $n \geq 1$.

3. The method of claim 1, said wait period being calculated periodically for each said specific client during each session by issuing a plurality of said DO TIMING MARK commands and receiving a plurality of said WILL TIMING MARK or WONT TIMING MARK responses.

4. Method for managing usage of a system resource in computer executing a Telnet application, comprising the steps of:
   issuing through a transport layer directed to a specific client a DO TIMING MARK command;
   responsive to receiving a WILL TIMING MARK or WONT TIMING MARK response from said specific client, calculating a WAIT_time as
      WAIT_time=$n*((y*AVG\_RTT)+((1-y)*NEW\_RTT\_SAMPLE)$;
      where AVG_RTT is the average wait time, NEW_RTT_SAMPLE is the most recently measured wait time between issuing said DO TIMING MARK and receiving said WILL TIMING MARK or WONT TIMING MARK response, y is a parameter set between 0 and 1 for selectively weighting the significance of said NEW_RTT_SAMPLE, and $n \geq 1$; and
   responsive to receiving no WILL TIMING MARK or WONT TIMING MARK response from said specific client within said WAIT_time, releasing said system resource.

5. System for managing usage of a system resource in a computer executing a Telnet application, comprising:
   means for issuing through a transport layer directed to a specific client a DO TIMING MARK command;
   means responsive to receiving a WILL TIMING MARK or WONT TIMING MARK response from said specific client for calculating a WAIT_time as
      WAIT_time=$n*((y*AVG\_RTT)+((1-y)*NEW\_RTT\_SAMPLE)$;
      where AVG_RTT is the average wait time, NEW_RTT_SAMPLE is the most recently measured wait time between issuing said DO TIMING MARK and receiving said WILL TIMING MARK or WONT TIMING MARK response, y is a parameter set between 0 and 1 for selectively weighting the significance of said NEW_RTT_SAMPLE, and $n \geq 1$; and
   means responsive to receiving no WILL TIMING MARK or WONT TIMING MARK response from said specific client within said WAIT_time, releasing said system resource.

6. System for managing usage of a system resource at a server by each of a plurality of clients in a communications system, comprising:
   means for tailoring a wait period for each specific client of said plurality of clients, including
      means for issuing through a transport layer a DO TIMING MARK command to each specific client;
      means responsive to receiving a WILL TIMING MARK or WONT TIMING MARK response from said specific client for calculating said period for said specific client; and means responsive to receiving no WILL TIMING MARK or WONT TIMING MARK response from said specific client within said WAIT time for releasing said system resource.

7. A program storage device readable by a machine, tangibly embodying a program of instructions executable by a machine to perform method steps for managing usage of a system resource in a computer executing a Telnet application, said method steps comprising:

tailoring a wait period for each specific client of said plurality of clients, including issuing through a transport layer a DO TIMING MARK command to each specific client;

responsive to receiving a WILL TIMING MARK or WONT TIMING MARK response from said specific client, calculating said period for said specific client; and responsive to receiving no WILL TIMING MARK or WONT TIMING MARK response from said specific client within said WAIT time, releasing said system resource.

8. An article of manufacture comprising:

a computer usuable medium having computer readable program code means embodied therein for managing usage of a system resource in a computer executing a Telnet application, the computer readable program means in said article of manufacture comprising:

computer readable program code means for causing a computer to effect tailoring a wait period for each specific client of said plurality of clients, including issuing through a transport layer a DO TIMING MARK command to each specific client;

responsive to receiving a WILL TIMING MARK or WONT TIMING MARK response from said specific client, calculating said period for said specific client; and computer readable program code means for causing a computer to effect responsive to receiving no WILL TIMING MARK or WONT TIMING MARK response from said specific client within said WAIT time, releasing said system resource.

9. Method for managing usage of a plurality of application user terminal devices used for reading and updating information stored at a host system, comprising the steps of:

establishing at a host server a virtual display device for a first terminal device;

issuing through a transport layer directed to a said first terminal device a DO TIMING MARK command;

responsive to receiving a WILL TIMING MARK or WONT TIMING MARK response from said first terminal device, calculating a WAIT time; and responsive to receiving no WILL TIMING MARK or WONT TIMING MARK response from said first terminal device within said WAIT time, releasing said virtual display device.

10. System for managing usage of a plurality of application user terminal devices used for reading and updating information stored at a host system, comprising the steps of:

means for establishing at a host server a virtual display device for a first terminal device;

means for issuing through a transport layer directed to a said first terminal device a DO TIMING MARK command;

means responsive to receiving a WILL TIMING MARK or WONT TIMING MARK response from said first terminal device for calculating a WAIT time; and means responsive to receiving no WILL TIMING MARK or WONT TIMING MARK response from said first terminal device within said WAIT time for releasing said virtual display device.

* * * * *